United States Patent [19]
Anderson

[11] Patent Number: 5,373,356
[45] Date of Patent: Dec. 13, 1994

[54] METHOD AND APPARATUS FOR IDENTIFYING ECHOES DETECTED BY AN OPTICAL TIME-DOMAIN REFLECTOMETER

[75] Inventor: Duwayne R. Anderson, Redmond, Oreg.

[73] Assignee: Tektronix, Inc., Wilsonville, Oreg.

[21] Appl. No.: 65,723

[22] Filed: May 21, 1993

[51] Int. Cl.$^5$ .................................. G01N 21/88
[52] U.S. Cl. .................................. 356/73.1
[58] Field of Search .................................. 356/73.1

[56] References Cited

U.S. PATENT DOCUMENTS 4,996,654  2/1991  Rosenow .................. 364/521
5,115,439  10/1992  Holmbo et al. .............. 324/534

OTHER PUBLICATIONS

"A New Technique in O.T.D.R.", Steven Newton, Electronics & Wireless World, May 1988, United Kingdom, pp. 496–500.
"Optical Fiber Splice Loss Predictions from One-Way OTDR Measurements Based on a Probability Model", L. Bjerkan, Journal of Lightwave Technology, vol. 7, No. 3, Mar. 1989, USA, pp. 490–499.
"Fiber-Optic Reflection Measurements Using OCWR and OTDR Techniques", F. P. Kapron et al., Journal of Lightwave Techlnlogy, vol. 7, No. 8, Aug. 1989, USA, pp. 1234–1241.
"Numerical Processing Provides a Boost for OTDR Resolution", John H. Haywood, Photonics Spectra, Laurin Publishing, Dec. 1989, pp. 88–92.

Primary Examiner—Vincent P. McGraw
Attorney, Agent, or Firm—William K. Bucher

[57] ABSTRACT

A controller (124) analyzes a set of OTDR return data stored in a memory (134) and determines if a particular event is an echo by comparing its measured location and/or amplitude (loss) with calculated locations (208) and amplitudes for various-order echoes. Possible echoes are optionally assigned an echo probability level (220, 224, 228) based on the degree to which their measured locations and/or amplitudes match the calculated echo locations and amplitudes. Possible echoes are appropriately marked (210) so that an OTDR display (136) indicates to a user which events are possible echoes. Optionally, events may be marked as having a low, medium, or high probability of being echoes.

20 Claims, 6 Drawing Sheets

METHOD AND APPARATUS FOR IDENTIFYING ECHOES DETECTED BY AN OPTICAL TIME-DOMAIN REFLECTOMETER

TECHNICAL FIELD

This invention relates to an optical time-domain reflectometer ("OTDR") and more particularly to identifying echoes mixed among valid events detected in returned OTDR data.

BACKGROUND OF THE INVENTION

In telecommunications and network applications, transmitters and receivers are interconnected by a signal transmission medium, such as a coaxial cable or an optical fiber. Faults in the signal transmission medium often cause undesired signal attenuation and even loss of signals transmitted over the medium. Time-domain reflectometry is a well-known technique for testing signal transmission media to determine the location and severity of such faults.

Time-domain reflectometry is functionally similar to radar. Pulses are periodically launched into the transmission medium by a transmitter. During the intervals between transmitted pulses, a return signal is received that includes reflections indicative of faults in the medium. The elapsed time between launching a pulse and receiving a reflection is indicative of the distance to the fault.

In OTDR applications, pulses of light are periodically launched through an optical fiber. Light propagating through the optical fiber is scattered by the fiber material by a mechanism referred to as "Raleigh Scattering" that causes some of the light to return through the fiber to the transmitter. Such returned light is referred to as "backscatter." Backscatter signal amplitude decreases exponentially as a function of the distance along the fiber.

Light reflections from other causes are referred to as events. Events have various causes. A fiber discontinuity, such as a splice, causes a loss of light amplitude in the fiber, but no light reflection. Such an event appears as an anomalous drop of backscatter amplitude starting at a distance in the fiber corresponding to the splice location. A fiber discontinuity, such as a mechanical connector, causes a pulse reflection that is added to the backscatter. An irregularity in the fiber can both be reflective and have light loss.

Locating such events is useful for determining fiber quality and fault locations. An OTDR typically displays a plot of return signal amplitude versus time from which the locations and amplitudes of events can be determined relative to a reference event such as an end of the fiber or a known connector or splice location.

There are previously known apparatus and methods for detecting and characterizing irregularities in fiber optic cables. In particular, U.S. Pat. No. 5,155,439 issued Oct. 13, 1992 for a METHOD OF DETECTING AND CHARACTERIZING ANOMALIES IN A PROPAGATIVE MEDIUM, assigned to the assignee of this application, describes a method for locating and characterizing reflective and nonreflective events in a backscatter return signal. The method my be used in a prior art OTDR such as the model OF235 Fiber Optical Time-domain Reflectometer manufactured by the assignee of this application. Such an OTDR samples the return signal at closely spaced time intervals representing points spaced along the length of the fiber. The resulting sampled data points are displayed on the OTDR as an amplitude-versus-time waveform. Because backscatter is a relatively weak signal, each data point displayed in the waveform is repetitively sampled and averaged to reduce noise to an acceptable level. Depending on the fiber length and desired waveform display resolution, a considerable amount of time (perhaps 10 minutes) may be required to collect and display the waveform. Finally, a human operator must interpret the displayed waveform to determine the event locations and amplitudes.

In addition to backscatter and events, echoes present in the return signal are a serious source of waveform contamination. Echoes can appear as real events even when no such event actually exists at its indicated location. Echoes, therefore, cause confusion and can lead to misinterpretation of faults by the OTDR operator.

Echoes in OTDR waveforms are caused by reflections off fiber components such as connectors and mechanical splices. Echoes are specifically related to valid reflective events in the waveform. When the launch pulse encounters a discontinuity (such as a connector), part of the pulse is typically transmitted, and part of the pulse is reflected back to the OTDR where it appears as an event. Echoes occur when reflected pulses encounter other fiber discontinuities while returning to the OTDR. A portion of the reflected pulse continues toward the OTDR while the remainder is rereflected in the same direction as the launch pulse. If the rereflected pulse encounters yet another reflective event, a portion will again be reflected toward the OTDR where the echo could appear as an event.

FIG. 1 schematically shows the process by which echoes develop in an optical fiber. A distance in an optical fiber, as measured from an OTDR front panel, is represented by a distance axis 10, and time is represented by a time axis 12. A launch pulse 14 is represented by a solid line that originates at a point 16 and propagates through the fiber to a fiber end point 18. The slope of the line is $n_{eff}/c$ where $n_{eff}$ is the effective group index of the optical fiber, and c is the velocity of light.

Reflective events are represented by vertical lines including a front panel event 20, a fiber end event 22, and discontinuity events 24 and 26. When launch pulse 14 encounters a reflective event, a portion of the pulse is reflected, and a remaining portion is transmitted. For example, when launch pulse 14 encounters discontinuity event 26, a reflected portion 28 and a transmitted portion 30 divide at the distance and time represented by a point 32.

To be observed by the OTDR, a pulse must be reflected an odd number of times. Valid data are contained in pulses that are reflected only once. In contrast, echoes are pulses that are reflected three, five, or more odd times.

Echoes are classified by the number of reflections they have undergone. First-order echoes are pulses that have been reflected three times, second-order echoes are those that have been reflected five times, and so on. FIGS. 2 and 3 schematically show the development of typical first- and second-order echoes. The number of echoes grows dramatically as the echo order number increases. For example, FIG. 1 shows, as dashed lines, only the first-order echoes present in a fiber with just four reflective events. Fortunately, because of fiber attenuation, echoes beyond second order are usually not detectable by the OTDR. However, this generalization has exceptions such as multimode cable installations having many highly reflective events spaced closely together.

Echoed pulses cannon be absolutely separated from valid pulses because the OTDR is a noncoherent, onedimensional laser radar than measures only the amplitude and time of the returning pulses. A conventional OTDR display, therefore, intermixes echo data and valid event data, thereby leaving to the operator the difficult task of interpreting the cluttered display.

What is needed, therefore, is an OTDR that can identify which return pulses are valid reflections and which are echoes, and alert the OTDR operator accordingly.

SUMMARY OF THE INVENTION

An object of this invention is, therefore, to provide an apparatus and a method for identifying OTDR return signals that are possible echoes.

Another object is to provide an apparatus and a method for further classifying possible echoes with an echo probability level.

A further object of this invention is to provide an apparatus and a method for indicating to an OTDR operator the location and/or probability level of events that are possible echoes.

Still another object of this invention is to provide an apparatus and a method for improving cable fault detection, location, and severity assessment.

A controller analyzes a set of OTDR return data and calculates the possibility that a particular event is an echo by comparing its measured location and/or amplitude (loss) with calculated locations and amplitudes for various-order echoes. Possible echoes are optionally assigned an echo probability level based on the degree to which their measured locations and/or amplitudes match the calculated echo locations and amplitudes. Possible echoes are appropriately marked so that an OTDR display indicates to the user which events are possible echoes. Optionally, events are marked as having a low, medium, or high probability of being echoes.

Additional objects and advantages of this invention will be apparent from the following detailed description of a preferred embodiment thereof which proceeds with reference to the accompanying drawings.

DETAILED DESCRIPTION OF PREFERRED EMBODIMENT

Figure 4:
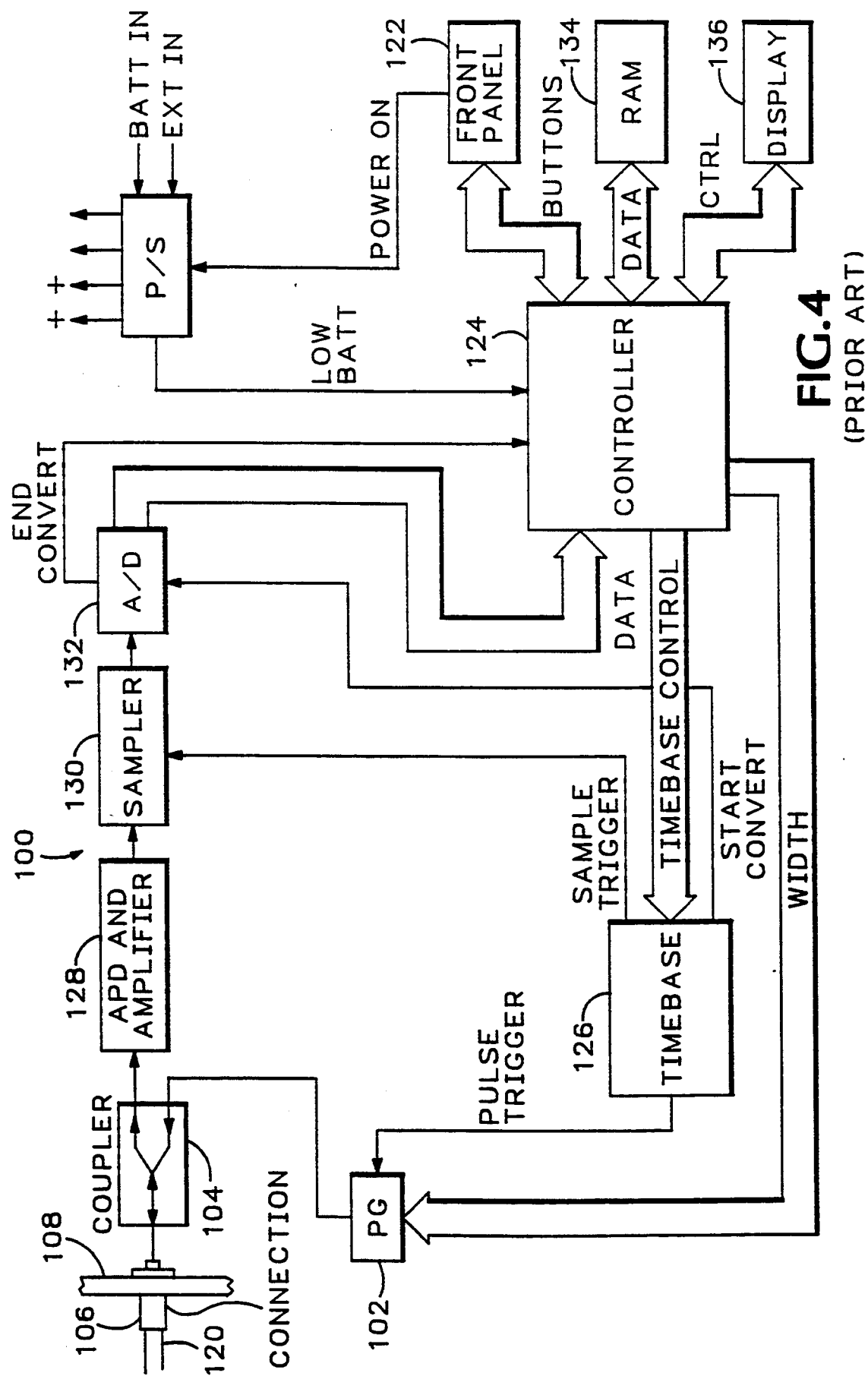
FIG. 4 is a schematic block diagram showing a prior art OTDR cable tester suitable for use with this invention.

FIG. 4 shows an OTDR 100 suitable for locating reflective events, including echoes, in an optical fiber. An optical pulse generator 102, in response to a "pulse trigger" signal, sends optical pulses via a coupler 104 to a connector 106 mounted in a housing 108 for launching into one end of an optical fiber 120 under test. Optical pulse generator 102 preferably uses a solid-state semiconductor laser because of its small size, spectral purity, and optical power capability. The laser output wavelength is chosen to match the requirements of the fiber being tested.

A "start test" command from a front panel 122 causes a controller 124 to start the testing process for optical fiber 120. A timebase 126 sends the pulse trigger signal to optical pulse generator 102 from which an optical pulse is launched through coupler 104, connector 106, and into optical fiber 120. Coupler 104 may optionally include an optical switch (not shown) for selectively inhibiting return reflections.

Return energy from optical fiber 120 enters OTDR 100 via connector 106 and coupler 104 from which it is passed to a detector/amplifier 128. The detector may be an avalanche photodiode. Detector/amplifier 128 generates an analog signal that is sampled by a sampling circuit 130. Analog signal samples from sampling circuit 130 are digitized by an analog-to-digital converter ("ADC") 132, the digital output of which is sent to controller 124 for processing. Controller 124 interacts with front panel 122 by which an operator selects appropriate operating parameters. Controller 124 accesses a random-access memory ("RAM") 134 that stores data, OTDR settings, and other variables. Sampled, digitized, and averaged return data are stored in RAM 134 by controller 124. The data, such as event numbers, losses, and distances, are presented on a display device 136, such as a liquid crystal display, in accordance with formatting provided by controller 124.

"Sample trigger" pulses from timebase 126 cause sampling circuit 130 to repetitively sample the return signal at a time corresponding to a predetermined location in optical fiber 120. Timebase 126 also generates a "start convert" signal that causes ADC 132 to digitize the analog data samples.

ADC 132 generates an "end convert" signal notifying controller 124 that a digitized data sample is ready. Controller 124 averages the digitized data samples from ADC 132 and determines when it is finished processing samples at the current location in optical fiber 120. The process is repeated with various combinations of intervals between the pulse trigger signal and sample trigger signals to fully test optical fiber 120.

When optical fiber 120 has been fully tested to detect and characterize events, including reflective and nonreflective anomalies, controller 124 formats the digitized and averaged data for viewing on display device 136. The formatted data may be displayed in symbolic form as described in U.S. Pat. No. 4,996,654 issued Feb. 26, 1991 for "A METHOD OF DISPLAYING ACQUIRED DATA," which is incorporated herein by reference and which is assigned to the assignee of the present application.

Figure 5:
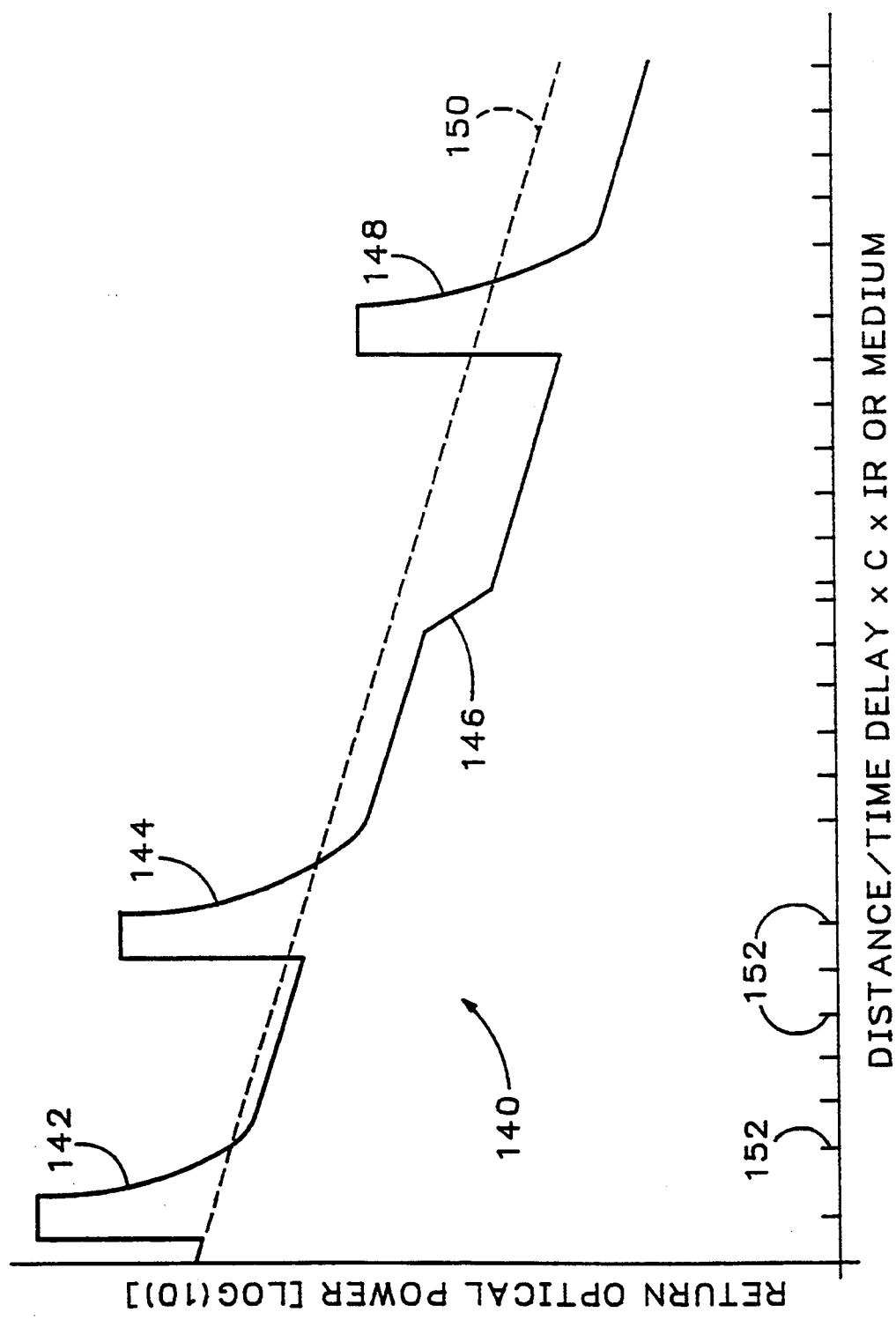
FIG. 5 is an amplitude-versus-time diagram representative of an acquired data waveform displayed on the OTDR of FIG. 4.

Alternatively, as shown in FIG. 5, the digitized and averaged data may be displayed as a logarithmic return signal amplitude 140 plotted as a function of time. Events shown include a front panel connector reflection 142, a reflection event with loss 144, a reflectionless loss event 146, and a reflection event without loss 148. A dashed line 150 represents the backscatter signal amplitude that would result if the optical fiber under test contained no anomalies or losses. Lines 152 represent data sample locations along the length of optical fiber 120.

Reflection event without loss 148 may or may not be an echo. But how can a user viewing the OTDR display be sure? Fortunately, echoes possess some defining attributes that make it possible to determine if a particular event might be an echo. Moreover, a lack of some attribute makes it possible to eliminate a particular event as an echo.

A first defining attribute of an echo is its location relative to reflective events, such as 142, 144, and 148, in OTDR waveform 140. To use this attribute, an equation for calculating all possible echo locations is derived.

A general "p'th-" order echo is defined as $E^p sr_i$, where p is the echo order and $sr_i$ is an "i'th" reflection subscript. Note that $i = 1 \ldots (2p+1)$, so that $E^p sr_i$ has $2p+1$ subscripts.

An "x" location of reflection $sr_i$ is defined as $xr_i$.

Figure 1:
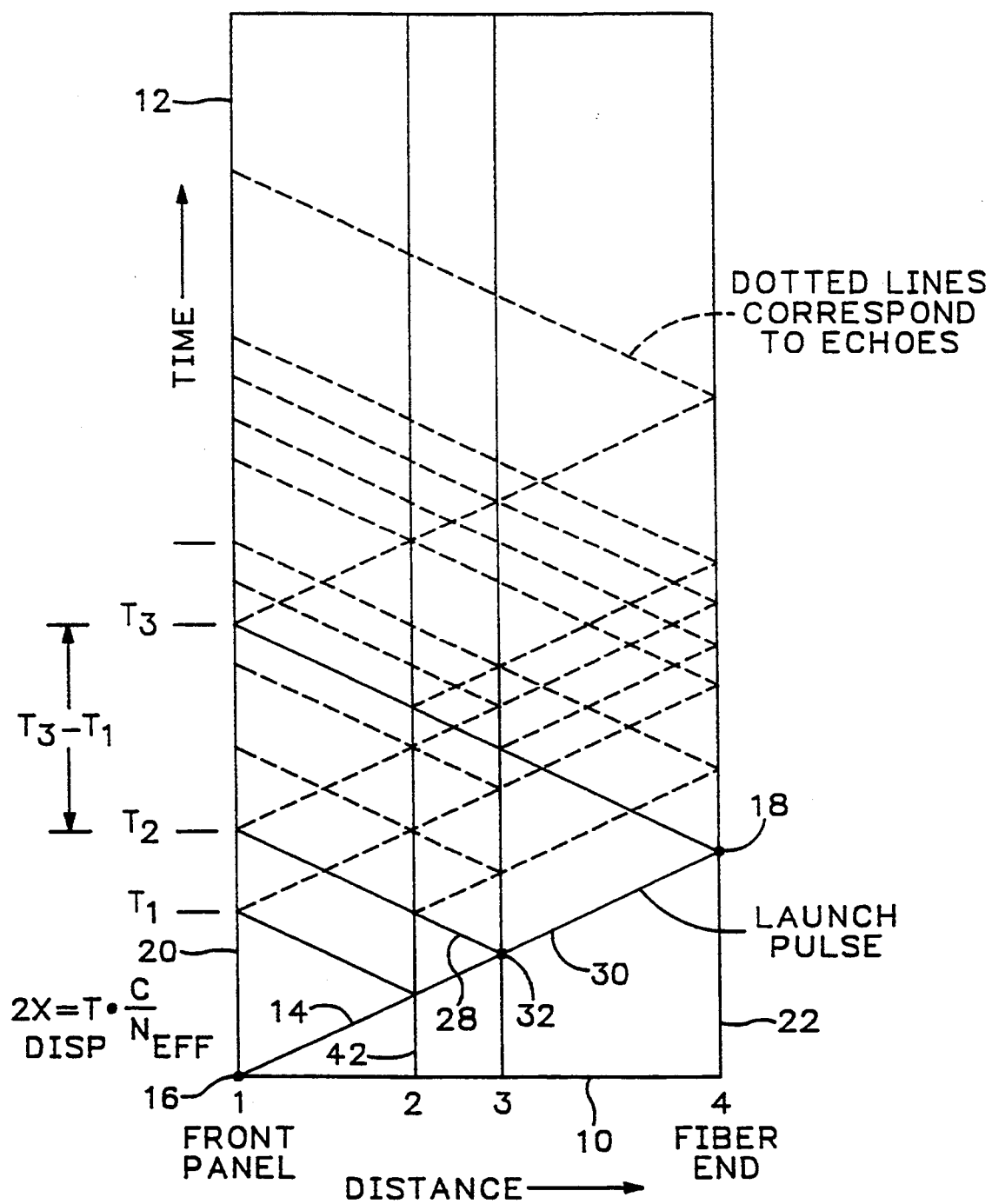
FIG. 1 is a distance-versus-time diagram that schematically shows the development of multiple echoes in an optical fiber having four discontinuities.
Figure 2:
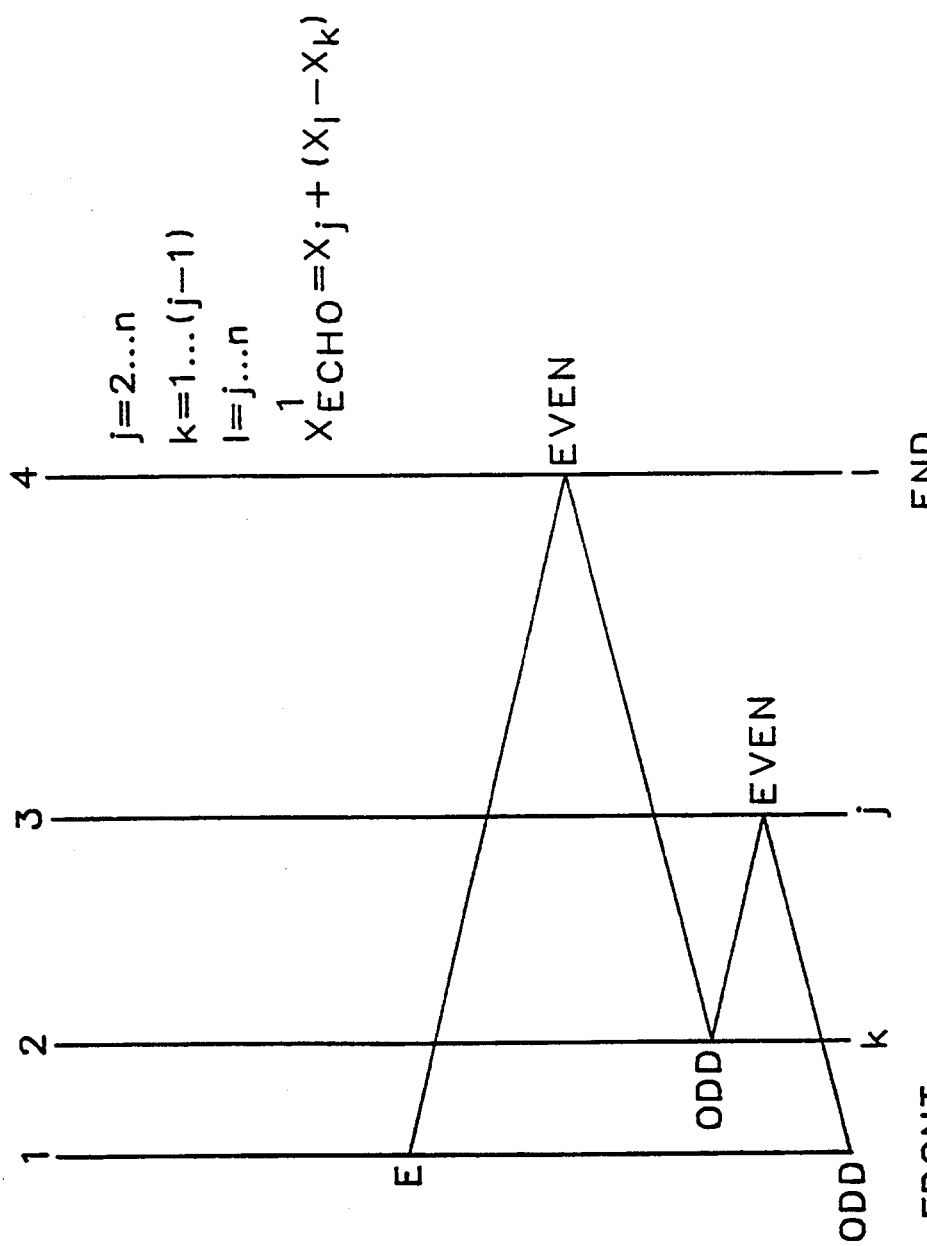
FIG. 2 is a distance-versus-time diagram that schematically shows the development of a first-order echo in an optical fiber having four discontinuities.
Figure 3:
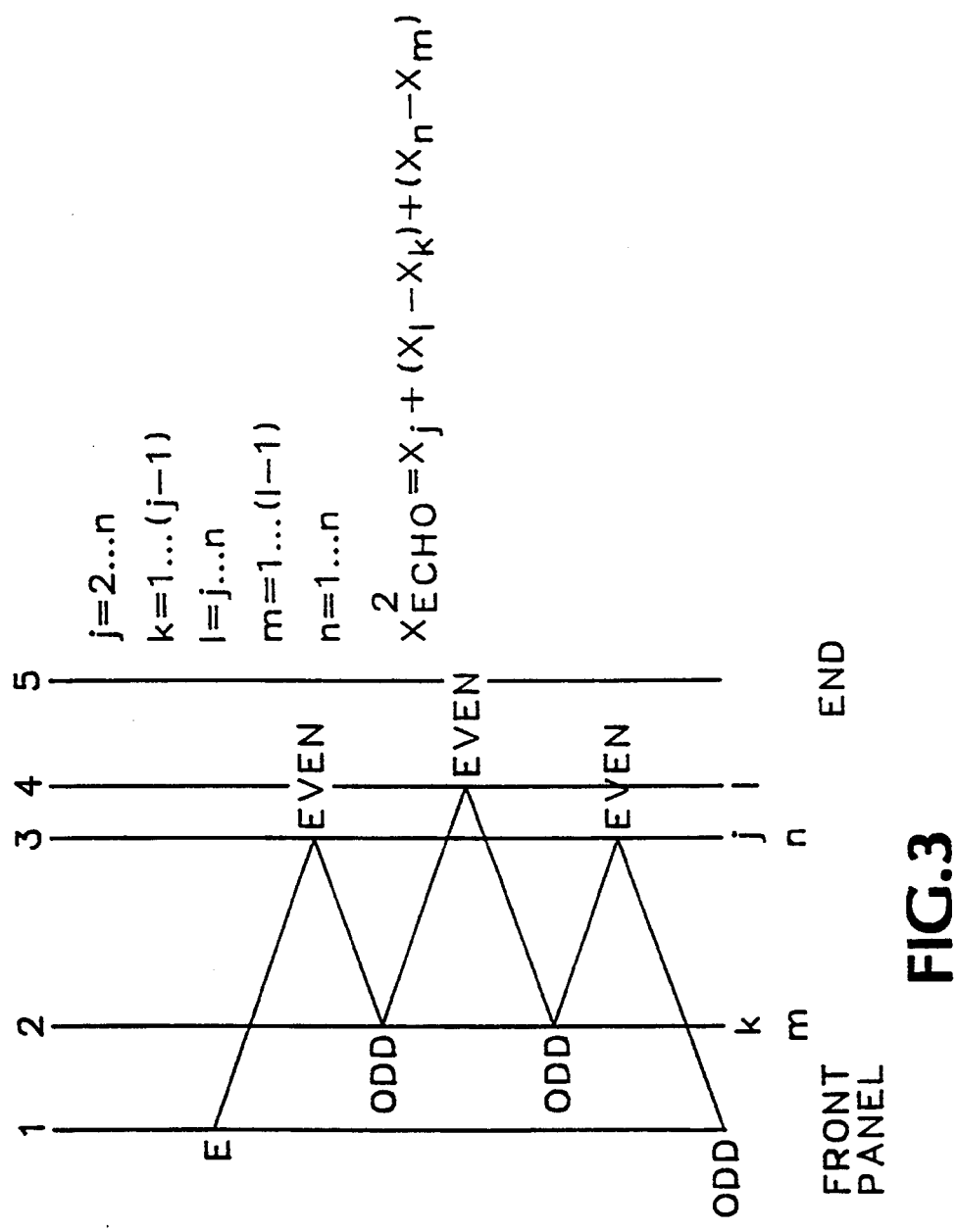
FIG. 3 is a distance-versus-time diagram that schematically shows the development of a second-order echo in an optical fiber having five discontinuities.

There are constraints on the values of $sr_i$ and $xr_i$ that can be deduced from FIGS. 1, 2, and 3. The constraints on xr are expressed below in equations [1] and [2]:

[1] $xr_i < xr_{i-1}$ and $xr_i < xr_{i+1}$ if i is even; and

[2] $xr_i > xr_{i-1}$ and $xr_i > xr_{i+1}$ if i is odd.

The constraints on sr are expressed below in equations [3], [4], and [5]:

[3] $sr_i = (sr_{i-1}+1) \ldots n$ if i is odd but not equal to 1;

[4] $sr_i = 1 \ldots (sr_{i-1}-1)$ if i is even; and

[5] $sr_i = 2 \ldots n$ if $i = 1$ and where n is the total number of reflective events including the front panel reflective event.

With reference to FIGS. 2 and 3, equations [1] and [2] relate respectively that odd-numbered reflections propagate toward OTDR 100 and even-numbered reflections propagate away from OTDR 100. Equations [3], [4], and [5] express, therefore, that odd-numbered reflections originate from locations that are further from OTDR 100 than adjacent even-numbered reflections, and even-numbered reflections originate from reflection locations that are closer to OTDR 100 than adjacent odd-numbered reflections.

Equations [1] through [5] are used to derive an equation [6] that expresses a total distance TD an echo propagates in optical fiber 120.

[6] $TDE^p xr_i = xr_1 + (xr_1 - xr_2) + (xr_3 - xr_2) + \ldots + (xr_{2p+1} - xr_{2p}) + xr_{2p+1}$.

Equation [6] can be rewritten as:

$TDE^p xr_i = 2xr_1 - 2xr_2 + 2xr_3 - 2xr_4 + \ldots - 2xr_{2p} + 2xr_{2p+1}$.

The distance to any event displayed on OTDR 100, including an echo, is half the total distance traveled by the launch pulse. Therefore, the displayed distance to an echo can be calculated with the following equation:

$$DE^p_{(xr_1, xr_2, \ldots, xr_{2p+1})} = xr_1 - \sum_{i=2}^{2p+1} xr_i \cdot (-1)^i \quad [8]$$

where (from equations [3] through [4]) $sr_1 = 2 \ldots n$, $sr_2 = 1 \ldots (sr_1 - 1)$, $sr_3 = (sr_2 + 1) \ldots n, \ldots$, and $sr_{2p+1} = (sr_{2p}+1) \ldots n$.

Using equation [8] it is possible to calculate the expected locations of all p'th-order echoes caused by reflective events located at $xr_i$, where $i = 1, 2 \ldots (2p+1)$. The general equation for the number of p'th-order echoes is:

$$NE^p = \sum_{sr_1} \left\{ \sum_{sr_2} \left( \ldots \sum_{sr_{2p+1}} (1) \ldots \right) \right\} \quad [9]$$

Equation [9] is used to derive equations [10], [11], and [12] from which the respective number of first-, second-, and third-order echoes can be calculated.

$$NE^1 = \sum_{sr_1=2}^{n} \left\{ \sum_{sr_2=1}^{sr_1-1} \left( \sum_{sr_3=sr_2+1}^{n} (1) \right) \right\} \quad [10]$$

$$NE^2 = \sum_{sr_1=2}^{n} \left\{ \sum_{sr_2=1}^{sr_1-1} \left( \sum_{sr_3=sr_2+1}^{n} \left\{ \sum_{sr_4=1}^{sr_3-1} \left( \sum_{sr_5=sr_4+1}^{n} (1) \right) \right\} \right) \right\} \quad [11]$$

$$NE^3 = \sum_{sr_1=2}^{n} \left\{ \sum_{sr_2=1}^{sr_1-1} \left( \sum_{sr_3=sr_2+1}^{n} \left\{ \sum_{sr_4=1}^{sr_3-1} \left( \sum_{sr_5=sr_4+1}^{n} (1) \left\{ \sum_{sr_6=1}^{sr_5-1} \left( \sum_{sr_7=sr_4+1}^{n} (-1) \right) \right\} \right) \right\} \right) \right\} \quad [12]$$

Equations [10], [11], and [12] can be reduced to the following simpler forms:

$$NE^1 = \frac{n(n-1)(2n-1)}{6} \quad [13]$$

$$NE^2 = \frac{n(n-1)(2n-1)(2n^2 - 2n + 1)}{30} \quad [14]$$

$$NE^3 = \frac{n(n-1)(2n-1)(68n^4 - 136n^3 + 133n^2 - 65n + 18)}{2,520} \quad [15]$$

Table 1 illustrates how rapidly the number of echoes can multiply.

TABLE 1

| n | NE¹ | NE² | NE³ |
|---|-----|------|---------|
| 1 | 0 | 0 | 0 |
| 2 | 1 | 1 | 1 |
| 3 | 5 | 13 | 34 |
| 4 | 14 | 70 | 353 |
| 5 | 30 | 246 | 2,037 |
| 6 | 55 | 671 | 8,272 |
| 7 | 91 | 1,547 | 26,585 |
| 8 | 140 | 3,164 | 72,302 |
| 9 | 204 | 5,916 | 173,502 |
| 10 | 285 | 10,317 | 377,739 |

The number of third-order echoes is particularly large. Fortunately, not all possible echo locations need to be calculated because many echo locations are beyond the last valid reflective event. Therefore, if equation [16] (shown below) is true, no further evaluation of echo locations is necessary.

$$DE^p_{(xr1, xr2, \ldots, xr2p+1)} = xr_1 - \sum_{i=2}^{2p+1} xr_i \cdot (-1)^i \geq x_n \quad [16]$$

However, if a reflective event is located at a calculated echo location, the reflective event is, at a minimum, contaminated by an echo. Location coincidence is the first attribute used to establish a level of probability that an event is an echo.

Event amplitude relative to the backscatter signal is the second attribute used to establish a level of probability that an event is an echo. FIG. 2 shows a first-order echo E generated by reflections from event locations $x_j$, $x_k$, and $x_l$. Echo E appears as a reflective event at location $x_j - x_k + x_l$ and has a reflective amplitude equal to the reflection amplitude at $x_j$ attenuated by the losses between $x_j$ and $x_k$ and between $x_l$ and $x_j$. The losses associated with events at $x_j$, $x_k$, and $x_l$ are used to calculate the loss between those locations only if the echo passes through the loss-causing event.

If a reflective event appears at a calculated location, and if its amplitude is attenuated by a calculated amount, there is an increased probability that the event is an echo.

If the OTDR lacks a dynamic range required to measure amplitude attenuation, an alternate approach can be used that estimates fiber attenuation between $x_j$ and the possible echo. If there is a relatively large amount of loss, or if the possible echo is below the backscatter amplitude, the probability is increased that the event is an echo.

The loss associated with a possible echo is the third attribute used to determine the probability that the event is an echo. Echoes generate not only discrete reflections, but also backscatter. However, backscatter generated by echoes is usually strongly attenuated and is generally not present in the OTDR waveform. Therefore, most echoes appear as reflective events with little or no loss. If the loss associated with an event is less than a predetermined threshold value, and if the event is located at a calculated echo location, the event has a high probability of being an echo.

Appendix 1 is a listing for a preferred BASIC program that identifies as possible echoes, those events in an OTDR event table that have locations corresponding to first- and second-order echo locations.

Appendix 1.

```
10 REM THIS PROGRAM CALCULATES THE LOCATIONS
   OF 1ST- AND 2ND-ORDER ECHOES AND
20 REM DETERMINES WHERE THEY OVERLAP THE
   INPUT LOCATIONS OF REFLECTIONS.
30 REM REFLECTIONS THAT ARE LOCATED WHERE
   1ST- OR 2ND- ORDER ECHOES ARE, ARE
40 REM CALLED POSSIBLE ECHOES.
50 CLS
60 LOCATE 7,30
70 INPUT "HOW MANY REFLECTIONS";N
80 NE = N*(N-1)*(2*N-1)/6
90 DIM ECHO(NE)
100 NE2 = N*(N-1)*(2*N-1)*(2*N 2-2*N+1)/30
110 DIM ECHO2(NE2)
120 DIM X(N)
130 DIM POSECHO(N)
140 DIM POSECHO2(N)
150 FOR M = 1 TO N STEP 1
160 CLS
170 LOCATE 7,30
180 PRINT "LOCATION OF EVENT"
190 LOCATE 7,47
200 PRINT "";M
210 LOCATE 7,49
220 INPUT "";X(M)
230 NEXT
240 NUM = 0
250 FOR J = 2 TO N STEP 1
260 FOR K = 1 TO (J-1) STEP 1
270 FOR L = K+1 TO N STEP 1
280 NUM = NUM + 1
290 ECHO(NUM) = X(J) + (X(L) - X(K))
300 NEXT
310 NEXT
320 NEXT
330 ECHOCOUNT = 0
340 FOR II = 1 TO NE STEP 1
350 FOR I = 1 TO N STEP 1
360 IF ABS(X(I) - ECHO(II)) <= .001 THEN
    POSECHO(I) = X(I)
370 NEXT
380 NEXT
390 FOR I = 1 TO N STEP 1
400 FOR II = 1 TO N STEP 1
410 IF II = I THEN GOTO 430 ELSE GOTO 420
420 IF POSECHO(II) = POSECHO(I) THEN POSECHO(I) = 0
430 NEXT
440 NEXT
450 PRINT " "
460 PRINT " "
470 LC = 0
480 FOR I = 1 TO N STEP 1
490 IF POSECHO(I) = 0 THEN GOTO 520 ELSE
    LOCATE 10+LC,30
500 PRINT "POSSIBLE ECHO AT";POSECHO(I)
510 LC = LC + 1
520 NEXT
530 NUM = 0
540 FOR J = 2 TO N STEP 1
550 FOR K = 1 TO (J-1) STEP 1
560 FOR L = K+1 TO N STEP 1
570 FOR M = 1 TO (L-1) STEP 1
580 FOR NN = M+1 TO N STEP 1
590 NUM = NUM + 1
600 ECHO2(NUM) = X(J) - X(K) + X(L) - X(M) + X(NN)
610 NEXT
620 NEXT
630 NEXT
640 NEXT
650 NEXT
660 ECHOCOUNT = 0
670 FOR II = 1 TO NE2 STEP 1
680 FOR I = 1 TO N STEP 1
690 IF ABS(X(I)-ECHO2(II)) <= .001 THEN
    POSECHO(I) = X(I)
700 NEXT
710 NEXT
720 FOR I = 1 TO N STEP 1
730 FOR II = 1 TO N STEP 1
740 IF II = I THEN GOTO 760 ELSE GOTO 750
750 IF POSECHO(II) = POSECHO(I) THEN POSECHO(I) = 0
```

```
                  -continued
                  Appendix 1.
760 NEXT
770 NEXT
780 PRINT " "
790 PRINT " "
800 LC1 = 0
810 FOR I = 1 TO N STEP 1
820 IF POSECHO(I) = 0 THEN GOTO 850 ELSE LOCATE
    10+LC+LC1+2,30
830 PRINT "POSSIBLE SECOND-ORDER
    ECHO AT";POSECHO(I)
840 LC1 = LC1 + 1
850 NEXT
860 END
```

The foregoing BASIC language program is shown by way of example to clearly describe the echo location algorithm. A preferred program implementation utilizes the C++ programming language to produce an equivalent program that more rapidly calculates the possible echo locations. Skilled workers will realize that OTDR measurement inaccuracies and cable propagation velocity changes dictate that echo location matching need not be exact. Therefore, a reflection is identified as a possible echo if its measured location is preferably within two standard deviations of a calculated echo location.

Figure 6:
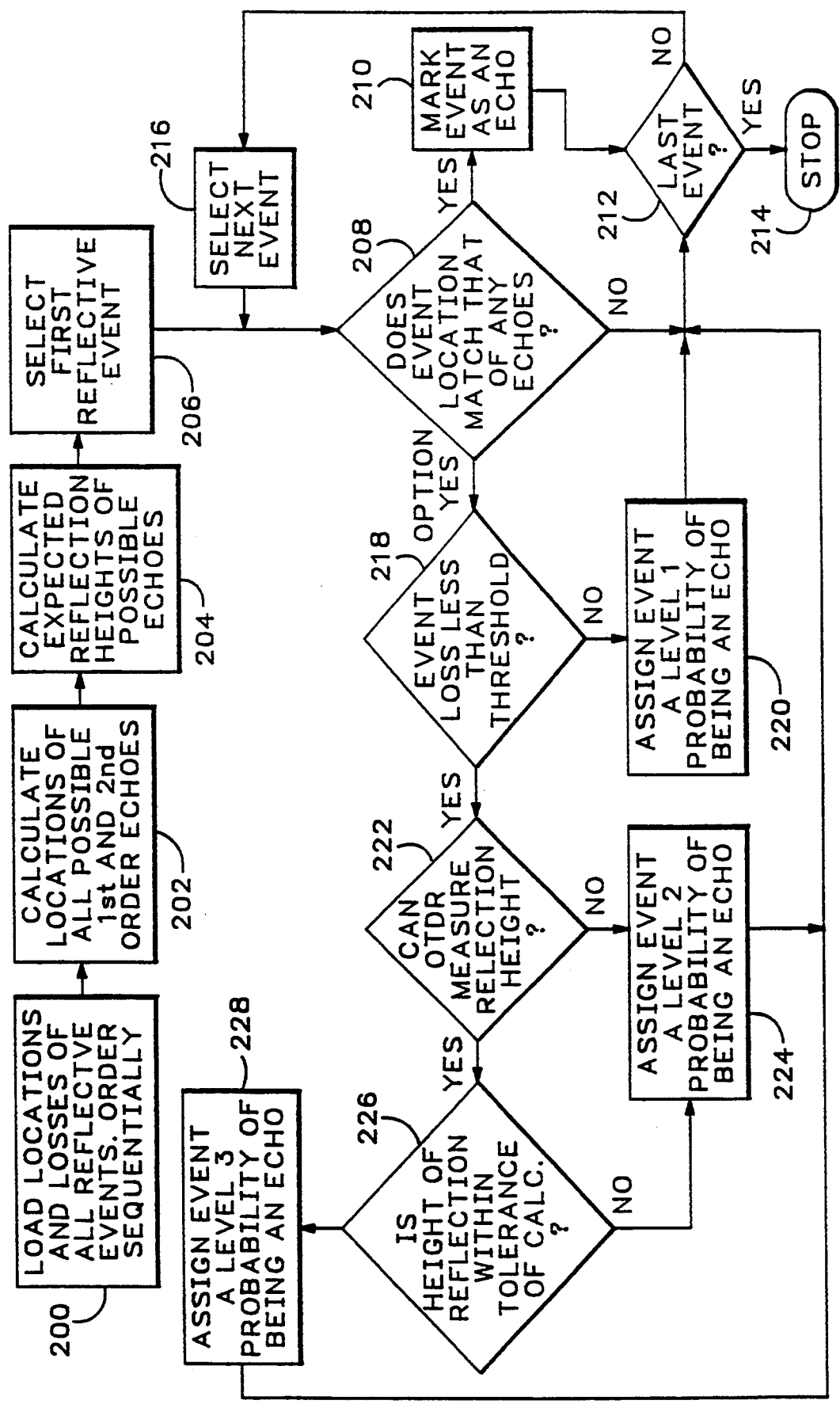
FIG. 6 is a decision flow chart showing the processing steps, according to this invention, used to identify events as possible echoes and to assign each an echo probability level.

FIG. 6 shows a data processing flow that is followed to determine whether an event is a possible echo and to optionally assign a probability factor to each event identified as a possible echo.

A data ordering step 200 entails sequentially ordering the measured OTDR event data that are collected and stored as described with reference to FIG. 4 and storing the ordered data in an event table.

A calculating step 202 entails calculating the locations of possible first- and second-order echoes in a manner such as that described with reference to Appendix 1.

An optional calculating step 204 entails calculating the expected reflection amplitudes associated with possible echoes.

A selecting step 206 entails selecting the first event data from the event table.

A decision step 208 determines whether the measured location of the selected event matches, within a predetermined tolerance, any of the echo locations calculated in step 202. If YES, a marking step 210 marks the selected event in the event table as an echo. If NO, a decision step 212 determines whether the selected event is a last sequentially ordered event in the event table. Optionally, echo probability determining steps (described below) are also carried out.

If decision step 212 returns a YES, the process is complete and is halted by a stop step 214. If a NO is returned, a next event step 216 selects the next sequentially numbered event from the event table. The newly selected event is processed in the above-described manner starting with decision step 208.

The process is repeated until all events in the event table are processed.

The optional echo probability determining process associated with decision step 208 follows the following steps.

If decision step 208 returns a YES, a decision step 218 determines whether a loss (amplitude difference) associated with the selected event is less than a threshold value. If a NO is returned, the selected event has loss that is typical for a valid event, and an assigning step 220 marks in the event table that the selected event has a level-1 probability of being an echo.

If decision step 218 returns a YES, the selected event has an amount of loss that might be associated with an echo, and a decision step 222 determines whether the event table includes a measured amplitude for the selected event. If a NO is returned, the selected event does not have a measured amplitude, and an assigning step 224 marks in the event table that the selected event has a level-2 probability of being an echo.

If decision step 222 returns a YES, the selected event has a measured amplitude, and a decision step 226 determines whether the measured amplitude matches a calculated event amplitude to within a predetermined tolerance. If a NO is returned, the selected event amplitude does not match the calculated amplitude, and assigning step 224 marks in the event table that the selected event has a level-2 probability of being an echo.

If decision step 226 returns a YES, the selected event amplitude matches the calculated amplitude for a valid event within the predetermined tolerance, and an assigning step 228 marks in the event table that the selected event has a level-3 probability of being an echo.

Following any of assigning steps 220, 224, or 228, decision step 212 is performed to determine whether the selected event is the last event in the event table. The optional echo probability determining process is repeated until all events listed in the event table are processed.

After all events in the event table are processed, a representative event table might have a format as shown below in Table 2.

TABLE 2

| EVENT NO. | DISTANCE METERS | LOSS DB |
|---|---|---|
| 1 | 10 | 0.1 |
| 2 | 25 | 0.3 |
| 3e2 | 100 | 1.2 |
| 4 | 1020 | 3.3 |
| 5e1 | 4999 | 6.5 |
| ... | ... | ... |
| N | 10005 | 10.0 |

In Table 2, the "3e2" entry indicates that event number 3 has a level-2 probability of being an echo, and the "5e1" entry indicates that event number 5 has a level-1 probability of being an echo.

An OTDR may display the processed event table in many alternative ways. For example, a model TFS3030 OTDR, manufactured by the assignee of this application, provides alphanumeric, symbolic, and conventional display formats.

The alphanumeric format displays the event table in a format similar to that shown in Table 2, but without the optional echo probability level indication.

The symbolic display format is like the one described in the aforementioned U.S. Pat. No. 4,996,654 in which a user aligns a cursor with an icon-marked event position in response to which a message indicating the type of event, its distance, and the associated loss. In addition, a "possible echo" message is displayed if the event is determined to be a possible echo. An echo probability level message may be associated with the possible echo message.

The conventional display format is like the one shown in FIG. 5. A user positions a cursor over an event and reads event distance and loss from calibrated indicators. A "possible echo" message is displayed in response to an acceptable match between the measured event distance and a calculated echo location. Again, an echo probability level message may be associated with the possible echo message.

Of course, an OTDR according to this invention may use event location and/or event amplitude (loss) to determine if the event is a possible echo. Likewise, skilled workers will realize that different amounts of event location accuracy, amplitude measurement accuracy, and OTDR dynamic range can be accommodated by this invention. Moreover, this invention is not limited to identifying first- and second-order echoes. Even though the program of Appendix 1 calculates the locations of first- and second-order echoes, it may be limited or expanded to calculate echo orders appropriate to a particular application.

It will be obvious to those having skill in the art that many changes may be made to the details of the above-described embodiments of this invention without departing from the underlying principles thereof. Accordingly, it will be appreciated that this invention is also applicable to signal identification applications other than those found in optical cable testing. The scope of the present invention should be determined, therefore, only by the following claims.

I claim:

1. In a time-domain reflectometer, a method for determining that a detected anomaly in a transmissive medium is a possible echo, comprising the steps of:
    launching a pulse into the transmissive medium;
    detecting a return signal indicative of the anomaly in the medium;
    storing data associated with the anomaly as event data, the event data including a measured location datum;
    calculating a set of possible echo locations; and
    marking the event data as a possible echo if the measured location datum substantially matches any of the set of possible echo locations.

2. The method of claim 1 further comprising the step of displaying the marked event data on a display device.

3. The method of claim 2 in which the displaying step includes formatting the event data such that it is presented alphanumerically, symbolically, or as an amplitude-versus-time plot.

4. The method of claim 1 in which the calculating step comprises calculating a set of echo locations associated with possible first- and second-order echoes.

5. The marking step of claim 1 in which the measured location datum matches any of the set of possible echo locations when the datum is within a distance that is within two standard deviations of a closest calculated echo location.

6. The method of claim 1 in which the storing step further includes storing a loss datum that is associated with the anomaly.

7. The method of claim 6 further including the step of assigning a first echo probability level to the event if the loss datum exceeds a threshold value.

8. The method of claim 7 further including the step of assigning a second echo probability level to the event if the loss datum is less than the threshold value and the loss datum is within a predetermined tolerance of a calculated amplitude of the return signal.

9. The method of claim 8 in which the marking step further includes marking the event data with data indicative of either the first or second echo probability levels.

10. A time-domain reflectometer apparatus for determining that a detected anomaly in a transmissive medium is a possible echo, comprising:
    a pulse generator launching a pulse into the transmissive medium;
    a detector detecting a return signal indicative of the anomaly in the medium;
    a memory storing data associated with the anomaly as event data, the event data including a measured location datum;
    a controller calculating a set of possible echo locations; and
    the controller marking the event data as a possible echo if the measured location datum substantially matches any of the set of possible echo locations.

11. The apparatus of claim 10 further comprising a display device that displays the marked event data.

12. The apparatus of claim 11 in which the display device is of a liquid crystal type.

13. The apparatus of claim 11 in which the controller formats the event data such that it is displayed alphanumerically, symbolically, or as an amplitude-versus-time plot.

14. The apparatus of claim 10 in which the pulse is a light pulse, the transmissive medium is an optical fiber, and the time-domain reflectometer is of an optical type.

15. The apparatus of claim 10 in which the controller calculates a set of echo locations associated with possible first- and second-order echoes.

16. The apparatus of claim 10 in which the measured location datum matches any of the set of possible echo locations when the datum is within a distance that is within two standard deviations of a closest calculated echo location.

17. The apparatus of claim 10 in which the event data further includes a loss datum that is associated with the anomaly.

18. The apparatus of claim 17 in which the controller assigns a first echo probability level to the event if the loss datum exceeds a threshold value.

19. The apparatus of claim 18 in which the controller assigns a second echo probability level to the event if the loss datum is less than the threshold value and the loss datum is within a predetermined tolerance of a calculated amplitude of the return signal.

20. The apparatus of claim 19 in which the controller further marks the event data with data indicative of either the first or second echo probability levels.

* * * * *